Patented April 11, 1972 3,656,029

2 Sheets-Sheet 1

INVENTORS
KIE Y. AHN
KYU C. PARK

BY Bernard N. Wiener
ATTORNEY

United States Patent

Ahn et al.

[15] 3,656,029

[45] Apr. 11, 1972

[54] BISTABLE RESISTOR OF EUROPIUM OXIDE, EUROPIUM SULFIDE, OR EUROPIUM SELENIUM DOPED WITH THREE D TRANSITION OR VA ELEMENT

[72] Inventors: Kie Y. Ahn, Bedford; Kyu C. Park, Yorktown Heights, both of N.Y.

[73] Assignee: International Business Machines Corporation, Armonk, N.Y.

[22] Filed: Dec. 31, 1970

[21] Appl. No.: 103,224

[52] U.S. Cl. ......................317/234 R, 252/62.3, 252/62.51, 317/234 S, 317/234 T, 317/234 V, 317/235 AP, 317/235 AQ

[51] Int. Cl. ..........................................H01l 3/16, H01l 3/22

[58] Field of Search ..............................317/234 V, 237, 238; 252/62.3 S, 62.3 GA, 62.3 V, 62.51

[56] References Cited

UNITED STATES PATENTS

| | | | |
|---|---|---|---|
| 3,336,514 | 8/1967 | Hiatt et al. | 317/234 |
| 3,343,076 | 9/1967 | Ovshinsky | 323/95 |
| 3,571,669 | 3/1971 | Fleming | 317/234 |
| 3,571,670 | 3/1971 | Ovshinsky | 317/234 |
| 3,571,673 | 3/1971 | Ovshinsky et al. | 317/234 |
| 3,574,675 | 4/1971 | Holtzberg | 117/201 |
| 3,574,676 | 4/1971 | Gambino et al. | 117/201 |

*Primary Examiner*—John W. Huckert
*Assistant Examiner*—William D. Larkins
*Attorney*—Hanifin and Jancin and Bernard N. Wiener

[57] ABSTRACT

This disclosure provides a bistable resistor and materials therefor. The bistable resistor has base electrode, intermediate layer and counter electrode. Illustratively, intermediate layer includes a rare earth chalcogenide, e.g., EuO or EuS, doped with a percentage by weight of either a group VA element, e.g., Bi, or a first row transition element, e.g., Cr. Further, the practice of the invention includes having the host intermediate layer comprised of a combination of a plurality of different rare earth chalcogenides, and having a dopant configuration which includes a combination of a plurality of the individually suitable dopants.

15 Claims, 5 Drawing Figures

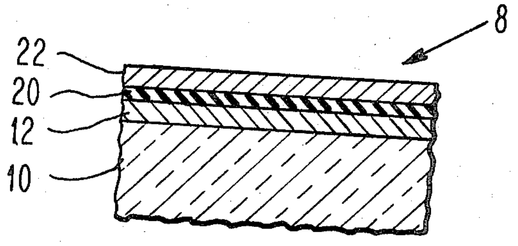

BISTABLE RESISTOR OF EUROPIUM OXIDE, EUROPIUM SULFIDE, OR EUROPIUM SELENIUM DOPED WITH THREE D TRANSITION OR VA ELEMENT

BACKGROUND OF THE INVENTION

Bistable resistors are known in the prior art which have required a high voltage forming step to establish them in operational condition with bistable switching characteristics. Such bistable resistors include a base electrode, an intermediate layer and a counter electrode. Exemplary of the prior art practice is the metal-niobium oxide-bismuth bistable resistor disclosed in U.S. Pat. No. 3,336,514 issued Aug. 15, 1967.

The rare earth chalcogenides are normally insulators, e.g., EuO is an insulator with typical room temperature resistivity of $10^8$ ohm-cm. It is known that when these materials are doped with trivalent ions, the resistivity thereof decreases considerably. However, doped rare earth chalcogenides have heretofore been used for magneto-optic and photo-optic devices, but the capability of such material and the use thereof for bistable resistive device has neither been recognized nor utilized.

The europium chalcogenides are magnetic compounds with semiconducting properties. In an example having stoichiometric composition, the typical electrical resistivity is $10^8$ ohm-cm at 300° K. This high resistivity decreases rapidly with addition of rare-earth ions or transition metals. For example, the resistivity decreases to $10^1$ to $10^2$ ohm-cm in EuO films doped with 1 to 2% of $Gd_2O_3$, accompanied by a large increase of the ferromagnetic Curie temperature (from 69.5° K to 140° K) as disclosed by K. Y. Ahn et al., *J. Appl. Physics*, 39, 5061 (1968).

It is an object of this invention to provide a bistable resistor and material therefore which does not require a forming step.

It is another object of this invention to provide a bistable resistor and material therefor selected from the group of rare earth chalcogenides doped with either a Group VA element or a first row transition element, e.g., EuO or EuS doped with Cr.

SUMMARY OF THE INVENTION

It has been discovered for the practice of this invention that suitably doped rare earth chalcogenides have bistable impedance levels when incorporated in a bistable resistor with metallic electrodes. Electrically conductive property is imparted to the rare earth chalcogenide by introducing therein a suitable dopant. Illustrative rare earth chalcogenides are EuO, EuS, EuSe, and EuTe. Exemplary dopants are either metals with partially filled 3-*d* electron levels such as the transition elements Ti, V, Cr, Mn, Fe, Co, or Ni or Group VA elements Bi, Sb, As, or P. The dopants go into the Eu chalcogenide layer in either neutral or ionic form, thereby producing mixed valence chalcogenides, and contribute conduction electrons with consequent lowering of the resistivity of the layer. Various metals such as Al, Au, Ag, Cu, Cr, NiFe, Ta, Nb, Mo, or W may be used as a base electrode. However, the refractory metals Cr, Ta, Nb, Mo, and W among these metals are preferred for the practice of this invention. The counter electrode may be any one of the following metals: Bi, Sb, Al, Ag, Au, Cu, Cr or NiFe.

Further, the practice of the invention includes having the host intermediate layer comprised of a combination of a plurality of different rare earth chalcogenides, and having a dopant configuration which includes a combination of a plurality of the individually suitable dopants.

The foregoing and other objects, features and advantages of the invention will be apparent from the following more particular description of preferred embodiments of the invention, as illustrated in the accompanying drawings.

PRACTICE OF THE INVENTION

Figure 1A:
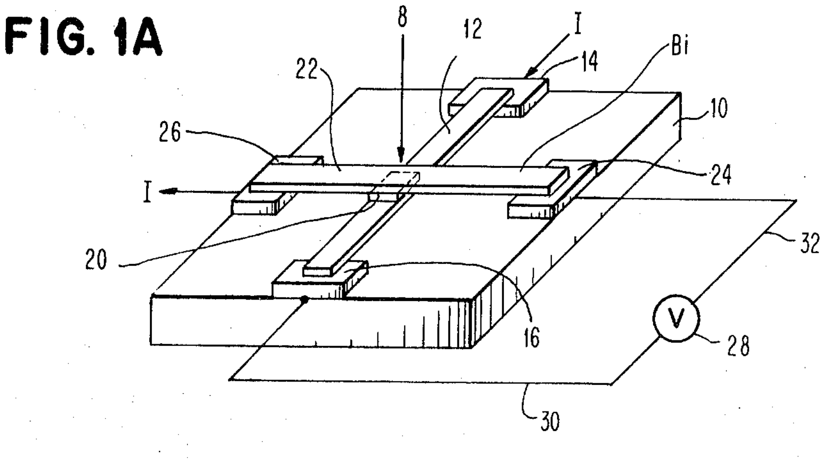
FIG. 1A is a perspective view of a bistable resistor arrangement in accordance with the principles of this invention showing an intermediate layer between a base electrode and a counter electrode.

FIG. 1A presents an embodiment of this invention wherein the bistable switchable resistor 8 is illustrated as a perspective view having an insulator substrate 10 with base electrode 12 fabricated thereon. Base electrode 12 is connected to contact electrodes 14 and 16. An intermediate layer 20 is fabricated on a portion of base electrode 12. Counter electrode 22 is fabricated on intermediate layer 20 and connected to contact electrodes 24 and 26. Current from a source not shown flows in the path consisting of contact electrode 14, base electrode 12, intermediate layer 20, counter electrode 22 and contact electrode 26. As will be explained with reference to FIG. 2A hereinafter, the direction of current flow is dependent on the particular state of the bistable resistor of FIG. 1A. The voltage monitor 28 provides a measure of the voltage across the bistable resistor of FIG. 1A and is connected to contact electrode 16 via connector 30 and to contact electrode 24 via connector 32. Operational data for several bistable resistors in accordance with the principles of this invention will be presented hereinafter. For purpose of exposition, the nature and function of the drawings hereof will be described with respect to the particular example having the following characteristics: substrate 10 is sapphire or glass; base electrode 12 is Ta; intermediate layer 20 is EuS with 9% Cr by weight homogeneously dispersed therein; counter electrode 22 is Bi. A cross-sectional view of the bistable resistor of FIG. 1A showing the relative relationships among the various materials at the cross-over between the base electrode and the counter electrode is presented in FIG. 1B. For the particular example concerning which the figures hereof will be described the bistable resistor has the additional physical parameters: width of base electrode and counter electrode is 0.010 inch; thickness of the base electrode and counter electrode is 6,000A., thickness of the Cr·EuS intermediate layer is 3,500A.

Figure 1B:
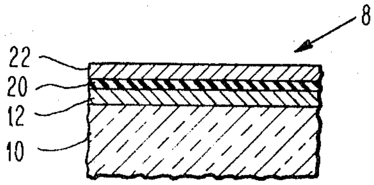
FIG. 1B is a cross-sectional view of the bistable resistor of FIG. 1A taken to show the relationship among the several materials therein.
Figure 2A:
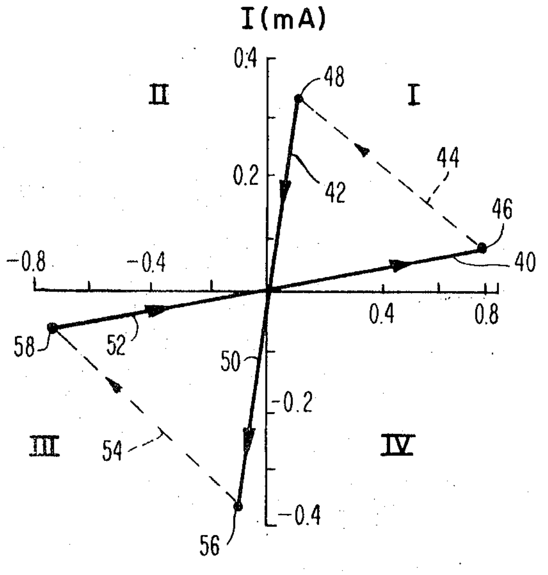
FIG. 2A presents a typical current vs. voltage curve for a bistable resistor of this invention consisting specifically of Ta base electrode, Cr doped EuS intermediate layer and Bi counter electrode.

The operational characteristics of the exemplary bistable resistor presented above with regard to FIGS. 1A and 1B are illustrated in FIG. 2A which is the current-voltage switching characteristic therefor. Considering the four quadrants, I, II, III and IV of FIG. 2A defined by the voltage V horizontal axis and the current I vertical axis, the switching characteristic has in quadrant I a high resistance branch 40 and an low resistance branch 42 with a transition therebetween via path 44 from point 46 on branch 40 to point 48 on branch 42. The Bi counter electrode of FIGS. 1A and 1B must be positive for switching to occur in the bistable resistor of this invention from the high resistance state at point 46 to the low resistance state at point 48. The remainder of the switching characteristic for the bistable resistor of the invention presented in FIG. 2A exists in quadrant III defined by the I and V axes. The switching characteristic in quadrant III of FIG. 2A exhibits the low resistance branch 50 and high resistance branch 52 with transition therebetween via path 54 from point 56 on branch 50 to point 58 on branch 52. The Bi counter electrode of the bistable resistor of this invention illustrated in FIGS. 1A and 1B must be negative relative to the base electrode for the transition from the low resistance state to the high resistance state in quadrant III.

Figure 2B:
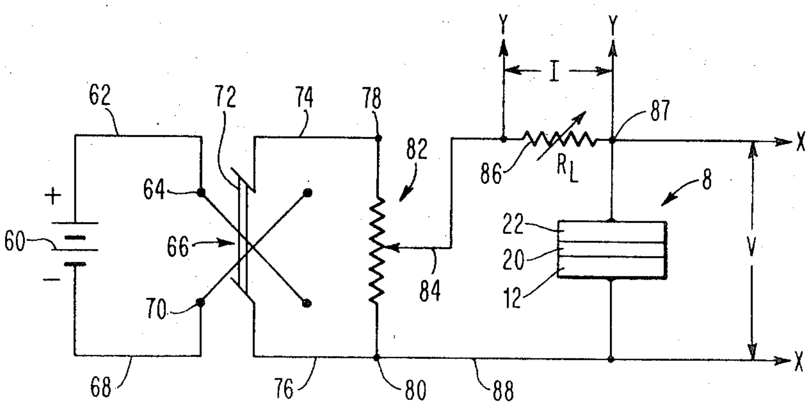
FIG. 2B is a circuit diagram of exemplary prior art apparatus showing connected to a bistable resistor for obtaining the I–V characteristic for a bistable resistor according to the principles of this invention for which an illustrative I–V curve is presented in FIG. 2A.

The switching characteristic presented in FIG. 2A for the exemplary bistable resistor of this invention consisting of Ta-Cr·EuS-Bi was obtained by the electrical circuitry presented in FIG. 2B which is useful both for obtaining such data and for operating the bistable resistor of FIGS. 1A and 1B in an operational environment. The electrical circuitry of FIG. 2B consists of a voltage source 60 connected from the positive terminal via lead 62 to contact 64 of double-pole, double-throw switch 66 and via lead 68 to contact 70 thereof. Double-pole, double-throw switch 66 has switch-on arrangement 72 such that when it is thrown to the left to communicate with contact 64 and 70 the positive terminal voltage source 60 is connected to lead 74 and negative terminal thereof is connected to lead 76. When the switch blade of double-pole, double-throw arrangement 72 is thrown to the right, the positive terminal voltage source 60 is connected to lead 76 and the negative terminal thereof is connected to lead 74. Terminals 78 and 80 of potentiometer 82 are connected to leads 74 and 76 respectively. Movable arm 84 of potentiometer 82 is connected to variable lead resistor 86 whose other end is connected to counter electrode 22 of bistable resistor 8. Potentiometer 82 is connected via lead 88 to base electrode 12 of switchable resistor 8.

In order to determine the switching characteristic for a bistable resistor in accordance with the principles of this invention, the electrical circuitry of FIG. 2B is connected to the bistable resistor 8.

Load resistor 86 may have several values for any particular measurement. However, it has been determined that certain values thereof provide optimum performance for the bistable resistor of this invention. Illustratively, for the Ta-Cr·EuS-Bi bistable resistor for which the switching characteristic is presented in FIG. 2A, it has been determined that a load resistor of 5000 ohms is especially suitable for switching in quadrant I and a load resistor of 500 ohms is especially suitable for switching in quadrant III. A comparative measure for the performance of a bistable resistor is the ratio of the resistance of the high resistance state at point 46 in quadrant I or point 58 in quadrant III to the resistance of the low resistance state at point 48 in quadrant I or point 56 in quadrant III. For the exemplary Ta-Cr·EuS-Bi bistable resistor described above, the ratio is 30:1 from a high resistance value of 9,000 ohms and a low resistance value of 300 ohms.

Conventional automated techniques for obtaining the switching characteristic of a bistable resistor in accordance with the principles of this invention may use either a curve tracer or a display cathode tube. The parameter for the horizontal V of the display is taken as X—X across bistable resistor 8 of FIG. 2B. The parameter for the vertical I is taken as Y—Y across the load resistor 86 of FIG. 2B. The ancillary electrical circuitry for making such a presentation is also conventional and will not be further described herein.

Figure 3:
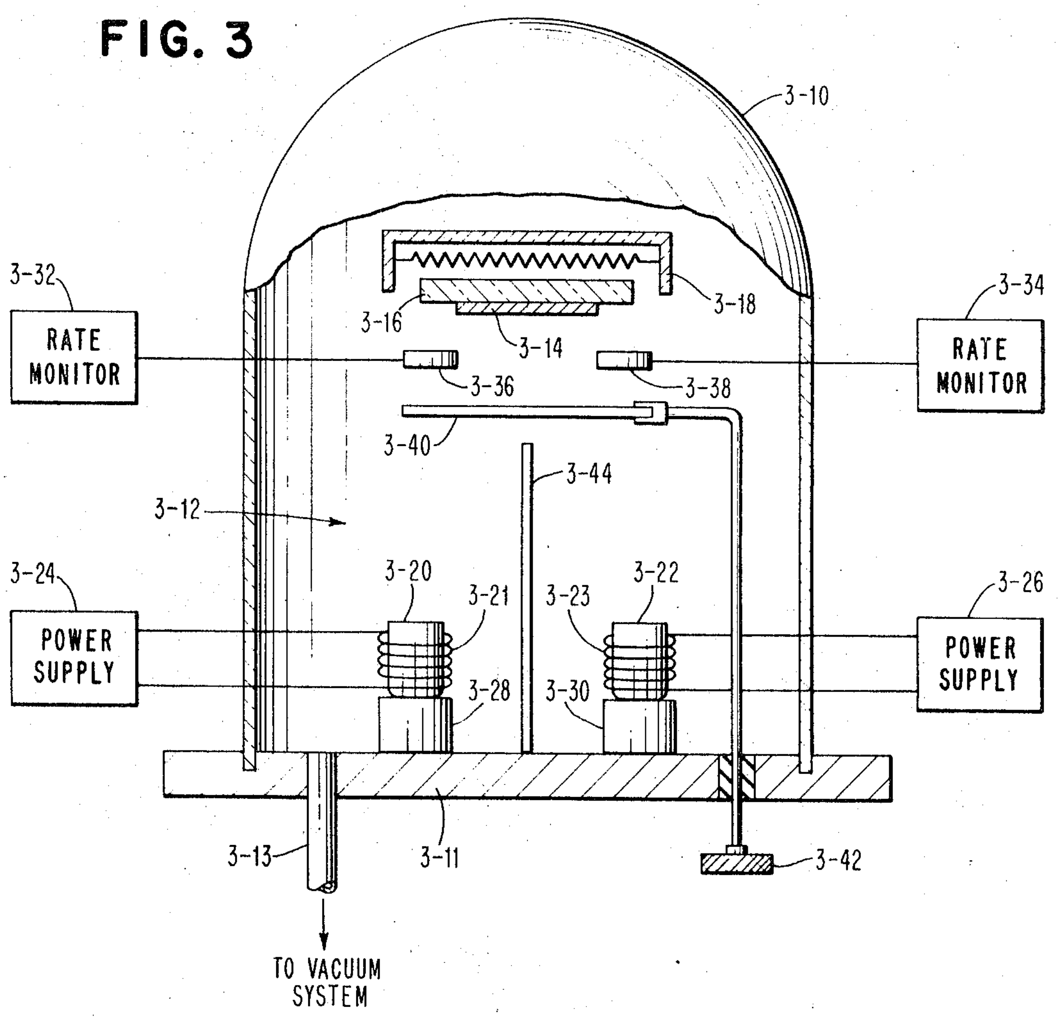
FIG. 3 is a partially exposed three-dimensional view partially in section of an evaporation system suitable for fabrication of the bistable resistor in accordance with the principles of this invention.

FIG. 3 shows a schematic arrangement of a suitable apparatus for fabricating a bistable resistor according to the principles of this invention. Only a substrate will be shown mounted in the arrangement, but conventional masking technique is utilized for establishing a particular pattern of a given layer and the arrangement of several sequential layers. The whole evaporation system excluding the power supplies and rate monitors is enclosed in an evacuated bell jar 3–10 which is mounted on support base 3–11. Chamber 3–12 defined by bell jar 3–10 and bell jar support 3–11 is established in vacuum condition by pipe 3-13 which is connected to an external vacuum system now shown. Exemplary substrate 3–14, e.g., of sapphire or of glass, is held in place by substrate holder 3–16. Substrate heater 3–18 maintains the substrate 3–14 at any predetermined temperature. For any given layer, the respective materials thereof are established in respective crucibles of which two exemplary crucibles 3–20 and 3–22 are illustrated. The exemplary crucibles 3–20 and 3–22 have windings 3–21 and 3–23 thereon which are connected to respective power supplies 3–24 and 3–26. Crucibles 3–20 and 3–22 are shown supported by stands 3–28 and 3–30. The rate of deposition of any given material is monitored by a respective quartz crystal rate monitor of which crystal rate monitors 3–32 and 3–34 are shown connected to quartz crystals 3–36 and 3–38 for monitoring the materials from crucibles 3–20 and 3–22 respectively. The beginning and end of a particular deposition run is controlled by shutter 3–40 operated via knob 3–42. Partition 3–44 prevents any undesirable contamination among the materials in the crucibles when that happens to be an important factor.

Background literature which provides detailed information about evaporation units and thin film technology useful for the practice of this invention are:

a. "Thin-Film Components and Circuits" by N. Schwartz et al., Physics of Thin Films — Advances in Research and Development, Vol. 2, 1964 Academic Press, pages 363–425.
b. "Focused-Beam Electron Bombardment Evaporator" by D. H. Blackburn et al., The Review of Scientific Instruments, Vol. 36, No. 7, July 1965, pages 901–903.
c. Vacuum Deposition of thin-films by L. Holland, John Wiley and Sons, Inc., 1960.

Procedures for the Invention

Examples of bistable resistors of this invention were prepared by vacuum evaporation of the base-electrode, intermediate layer, and counter-electrode via mechanical masks with 0.020 inch lines. An intermediate layer of Cr·EuO was deposited by simultaneous evaporation of Eu,$Eu_2O_3$, and Cr from respective crucibles in the evaporation arrangement of FIG. 3 in the pressure range of 6–10 × $10^{-6}$ Torr at a deposition rate of 20–25 A./sec. An exemplary glass substrate was heated to approximately 100° C. on a predeposited counter-electrode pattern. The base-electrode was deposited through a mechanical mask in a separate pump down of the evaporation arrangement.

For an intermediate layer of Cr·EuS, the intermediate layers were evaporated in accordance with the evaporation unit shown in FIG. 3 or alternatively, by an electron-beam gun, not shown, with an input power of 750 watts, i.e., 75 milliamperes at 10 kilovolts. For the electron-beam gun arrangement, the doping of EuS with Cr was accomplished by simultaneous evaporation of Cr and EuS using two electron-beam guns. Evaporation rate was set to produce an intermediate layer of approximately 8–10% of Cr by weight. The intermediate layer was deposited onto a counter-electrode supported by a glass substrate heated to approximately 100° C. at pressure in the range of 4–6 × $10^6$ Torr and evaporation rate of approximately 350A./minute.

The metallurgical structure of exemplary Cr·EuO and Cr·EuS intermediate layers was essentially the same as for pure EuO and EuS samples as examined by X-ray diffraction. Typical grain size of the intermediate layer was approximately 150A. The optical properties of the intermediate layers have characteristic absorption peaks corresponding to the *4f–5d* transitions with the peak absorption at 0.6 microns for EuO and 0.5 microns for EuS at 300° K.

EXAMPLES OF THE INVENTION

Table I presented below provides exemplary data for examples of bistable resistors according to the principles of this invention including an intermediate layer of EuO doped with Cr. Table II provides data for intermediate layers of EuS doped with Cr.

TABLE I

Switching Properties in Cr-doped EuO Films

Width of base-electrode and counter-electrode: 0.020 in.;
Thickness of electrodes: 2,500A;
Thickness of Cr·EuO intermediate layer: 2,000A;
Weight % of Cr in intermediate layer: 4%;
Typical load resistance: 500 ohms.

| Film Layers | High R (ohm) | Low R (ohm) | Ratio |
|---|---|---|---|
| Al-Cr·EuO-Bi | 800 | 160 | 5 |
| Cu-Cr·EuO-Bi | 830 | 200 | 4.2 |

TABLE II

Switching Properties in Exemplary Cr-doped EuS Films

Width of base-electrode and counter-electrode: 0.010 in.;
Thickness of electrodes: 6,000A;
Thickness of Cr·EuS intermediate layer: 3,500A;
Weight % of Cr in intermediate layer: 9%;
Typical load resistance: 5000 ohms in quadrant I and 500 ohms in quadrant III.

| Film Layers | High R (ohm) | Low R (ohm) | Ratio |
|---|---|---|---|
| Ta-Cr·EuS-Bi | 9,000 | 300 | 30 |
| Au-Cr·EuS-Bi | 4,000 | 1,300 | 3.1 |

We claim:

1. A passive solid-state device exhibiting two stable resistive states comprising:
a base-electrode;
an intermediate layer on said base-electrode including a host material of rare earth chalcogenide having a conductivity enhancing dopant therein, the ratio of the weight percent of said dopant to the weight percent of said rare earth element determining said two stable resistive states, wherein said dopant comprises at least one member selected from the group consisting of the group VA elements and Ti, V, Cr, Mn, Fe, Co, and Ni, and
a counter-electrode on said intermediate layer.

2. Device as set forth in claim 1 wherein said dopant is a Group VA element.

3. Device as set forth in Claim 1 wherein said dopant is a transition element.

4. Device as set forth in claim 1 wherein said weight percent of said dopant is approximately in the range 1% to 30%.

5. Device as set forth in claim 1 wherein said rare earth chalcogenide is a Eu chalcogenide.

6. Device as set forth in claim 5 wherein said chalcogenide is selected from the group consisting of S, O, Te and Se;
and said counter-electrode is selected from the group consisting of Bi and Sb.

7. Device as set forth in claim 5 wherein said Eu chalcogenide is selected from the group consisting of EuO, EuS, EuTe and EuSe;
said dopant for said rare earth chalcogenide being selected from the transition element group consisting of Ti, V, Cr, Mn, Fe, Co, and Ni.

8. Device as set forth in claim 5 wherein said rare earth chalcogenide is selected from the group consisting of EuO, EuS, EuTe, and EuSe; and
said dopant for said rare earth chalcogenide is selected from the group VA elements consisting of Bi, Sb, As and P.

9. Device as set forth in claim 1 wherein said base-electrode is selected from the group consisting of Al, Au, Ag, Cu, Cr, NiFe, Ta, Nb, Mo and W; and
said counter-electrode is selected from the group consisting of Bi, Sb, Al. Ag, Au, Cu, Cr and NiFe.

10. Device as set forth in claim 9 wherein said base-electrode is selected from the group consisting of Ta, Nb, Mo and W.

11. A bistable resistor having two switchable stable states, one said stable state being a low resistance state and said other stable state being a high resistance state, comprising:
a base-electrode;
an intermediate layer on said base-electrode consisting of a rare earth chalcogenide with a conductivity enhancing dopant therein, the ratio of the weight percent of said dopant to the weight percent of said rare earth element determining said two switchable stable resistive states, wherein said dopant comprises at least one member selected from the group consisting of the group VA elements and Ti, V, Cr, Mn, Fe, Co, and Ni; and
depositing a counter-electrode on said intermediate layer.

12. Device as set forth in claim 11 wherein said rare earth chalcogenide is EuS;
said dopant is Cr;
said base-electrode is a metal; and
said counter-electrode is Bi.

13. Device as set forth in claim 11 wherein said rare earth chalcogenide is EuO;
said dopant is Cr;
said base-electrode is a metal; and
said counter-electrode is Bi.

14. Device as set forth in claim 11 wherein said rare earth chalcogenide is selected from the group consisting of EuO, EuS, EuTe and EuSe;
said dopant is selected from the group consisting of Ti, V, Cr, Mn, Fe, Co, Ni, Bi, Sb, As and P;
said base-electrode is selected from the group consisting of Al. Au, Ag, Cu, Cr, NiFe, Ta, Nb, Mo, and W; and
said counter-electrode is selected from the group consisting of Bi, Sb, Al. Ag, Au, Cu, Cr, and NiFe.

15. Device as set forth in claim 11 wherein said weight percent of said dopant is approximately in the range 1 to 30 percent.

* * * * *